(12) United States Patent
Fries

(10) Patent No.: US 12,466,451 B2
(45) Date of Patent: Nov. 11, 2025

(54) METHOD AND SYSTEM FOR ESTIMATING TEMPERATURE-RELATED FORCES IN RAILWAY LINES

(71) Applicant: KB Signaling Inc., West Henrietta, NY (US)

(72) Inventor: Jeffrey Fries, Grain Valley, MO (US)

(73) Assignee: KB Signaling Inc.

( * ) Notice: Subject to any disclaimer, the term of this patent is extended or adjusted under 35 U.S.C. 154(b) by 1084 days.

(21) Appl. No.: 17/448,825

(22) Filed: Sep. 24, 2021

(65) Prior Publication Data
US 2023/0094944 A1    Mar. 30, 2023

(51) Int. Cl.
| | |
|---|---|
| *B61L 27/53* | (2022.01) |
| *B61L 3/18* | (2006.01) |
| *B61L 23/04* | (2006.01) |
| *B61L 27/70* | (2022.01) |
| *G01J 5/00* | (2022.01) |
| *G01N 27/04* | (2006.01) |

(52) U.S. Cl.
CPC ............ *B61L 23/042* (2013.01); *B61L 3/18* (2013.01); *B61L 27/53* (2022.01); *B61L 27/70* (2022.01); *G01J 5/00* (2013.01); *G01N 27/041* (2013.01); *B61L 2205/00* (2013.01)

(58) Field of Classification Search
CPC ........... B61L 23/042; B61L 3/18; B61L 27/53
See application file for complete search history.

(56) References Cited

U.S. PATENT DOCUMENTS

| | | | | |
|---|---|---|---|---|
| 5,217,304 | A | * | 6/1993 | Ortiz .................... G01N 27/041 374/E1.005 |
| 7,268,565 | B2 | * | 9/2007 | Anderson ............... B61L 1/181 246/121 |
| 2007/0132463 | A1 | * | 6/2007 | Anderson ............... B61L 1/181 324/713 |
| 2007/0265780 | A1 | * | 11/2007 | Kesler ..................... G01K 7/42 374/E7.042 |
| 2018/0052127 | A1 | * | 2/2018 | Tützauer ................ G01R 27/26 |
| 2020/0156674 | A1 | * | 5/2020 | Qin ................... G06F 18/23213 |
| 2021/0131888 | A1 | * | 5/2021 | Rizos .................... B61L 23/045 |

FOREIGN PATENT DOCUMENTS

| | | | | | |
|---|---|---|---|---|---|
| BR | 102017026315 | B1 | * | 5/2023 | ............. B61L 1/187 |
| CN | 111637991 | | * | 9/2020 | ............... G01L 1/20 |
| CN | 111637991 | A | * | 9/2020 | ............... G01L 1/20 |
| CN | 113051705 | A | * | 6/2021 | ............. G01K 11/26 |

* cited by examiner

*Primary Examiner* — Catherine T. Rastovski
*Assistant Examiner* — Agustin R Campozano
(74) *Attorney, Agent, or Firm* — David L. Nocilly; Bond Schoeneck & King PLLC

(57) ABSTRACT

A method and system are for estimating forces in rails of a railway line which are due to the temperatures of the rails. Values of the electrical resistance of one rail of a railway track section are calculated. Based on the calculated values of the electrical resistance for the rail, corresponding values of the temperature of the rail can be estimated, and based on the estimated values of the temperature of the rail, estimated values of forces acting in the rail due to the temperature values can be estimated.

13 Claims, 3 Drawing Sheets

METHOD AND SYSTEM FOR ESTIMATING TEMPERATURE-RELATED FORCES IN RAILWAY LINES

FIELD

The present disclosure relates in general to the field or railway systems, and more specifically to a method and system for estimating forces in the rails of railway lines which are caused by the varying temperatures of the rails themselves.

BACKGROUND

As known, over the last few decades, in order to improve the ride comfort for passengers and to reduce mechanical wear of some assets used, such as tracks, wheels, et cetera, railroads have shifted more and more from using jointed rails to using continuous welded rails.

However, while the use of continuous welded rails allows on one hand to improve comfort for passengers and to reduce the mechanical wear of some of the assets used, on the other hand it makes the management of mechanical forces in the rails an increasingly important factor for the reliability and safety of railway lines.

These mechanical forces can be compressive forces (pushing) or tensile forces (pulling) and their onset in the rails is largely if not exclusively caused by the varying temperatures of the rails. In particular, compressive forces occur when temperatures are high and the steel of the rails tends to expand, while tensile forces occur when temperatures are low and the steel of the rails tends to contract.

Due to the fact that continuous welded rails lack of relief points through mechanical joints along their extension, when there is a too much compressive force, the rails can buckle causing the gauge of the track to be out of compliance, thus creating a dangerous situation which can potentially lead to a derailment of a passing train. If instead there is a too much tensile force, a rail can break and pull apart, also entailing potential risks for the derailment of a passing train.

While broken rails can be somehow detected using existing technologies, for example via track circuits which are installed along a railway and are capable of identifying that electric currents flowing through the rails are interrupted due to such conditions of the rails, the condition of buckled rails is still an issue; indeed, for example in USA there are on average some tens of derailments per year, which are caused by undetected rail buckles, and may have severe consequences and costs.

At present, some solutions have been implemented in order to face such issues.

For example, one solution foresees to control at the time of installation the so-called Rail Neutral Temperature (RNT), which is the temperature of the rail at which there are not temperature-related forces in the rail. The value of the RNT is set at installation time, such that the maximum compressive and tensile forces are minimized based on expected rail temperature swings.

This solution generally yields some positive results, but only until the set RNT changes. Changes in the RNT previously set can be caused by many factors, such as for example the mechanical integrity of the substructure on which the rails lay, anchor points to ties/sleepers, curvature of the rails, repeated train passages, and rail repairs. In practice, once a rail is installed, there are no practical means available for continuously measuring the actual RNT. Thus, the risk of a buckle or break of rails cannot be properly understood and managed over the time.

Other solutions used in most railroads foresee to manage the risks of buckled or broken rails by using data from local weather forecasts; for example, if the air temperature in a certain area is colder or hotter than some thresholds that might lead to excessive forces in the rails, operators may impose speed restrictions on the trains transiting in that area.

Clearly, also this solution has some drawbacks. For instance, the weather forecasts are not always accurate and may not be able to predict localized conditions.

Additionally, the temperature of the rails is not the same as the air temperature. For example, during cloudy days or at night, the rail temperature and the air temperature can be somehow close to each other, e.g. with a difference of 10-20 degrees F. On the contrary, during sunny days, the rail temperature can be up to 60 degrees F. hotter than the air temperature.

Alternatively, some railroads, rather than relying on weather data alone, may send personnel out to the field to physically measure the temperature of the rails with infrared thermometers, which can be a costly maintenance activity.

In other cases, temperature sensors may be attached to the rails, but also this solution is very expensive to be deployed over an entire rail network and additionally requires some dedicated means of communication.

SUMMARY

Hence, it is evident that there is room and desire for improvements in the way forces in rails caused by the varying temperatures of the rails themselves are assessed.

The present disclosure is aimed at providing a solution to this end and, in one aspect, it provides a method for estimating forces in rails of a railway line which are due to the rails temperatures, the method comprising:
  calculating one or more values of an electrical resistance of at least one rail of at least one track section of the railway line;
  based on the one or more calculated values of the electrical resistance for the at least one rail, estimating one or more corresponding values of a temperature of said at least one rail; and
  based on the one or more estimated values of the temperature of the at least one rail, estimating one or more values of forces acting in the at least one rail due to the one or more temperature values estimated for the at least one rail.

In another aspect, the present disclosure provides a control system for estimating forces in rails of a railway line which are due to the rails temperatures, the control system comprising at least a controller configured to:
  calculate one or more values of an electrical resistance of at least one rail of at least one track section of the railway line;
  based on the one or more calculated values of the electrical resistance for the at least one rail of the at least one track section, estimate one or more corresponding actual values of a temperature of said at least one rail; and
  based on the one or more estimated values of the temperature of the at least one rail, estimating one or more values of forces acting in the at least one rail due to the one or more temperature values estimated for the at least one rail.

In a further aspect, the present disclosure provides a computer-readable medium comprising software code stored therein which, when executed by a processor, executes or initiates the execution of a method for estimating forces in rails of a railway line which are due to the rails temperatures, the method comprising:

calculating one or more values of an electrical resistance of at least one rail of at least one track section of the railway line;

based on the one or more calculated values of the electrical resistance for the at least one rail, estimating one or more corresponding values of a temperature of said at least one rail; and based on the one or more estimated values of the temperature of the at least one rail, estimating one or more values of forces acting in the at least one rail due to the one or more temperature values estimated for the at least one rail.

In yet another aspect, the disclosure provides a method of driving a train over a section of rails of a railway line, comprising:

estimating the forces in a section of the rails according to the method for estimating forces in rails of a railway line described above;

tracking a trend in the forces in the section of the rails over time; and issuing a warning signal to a driver of the train approaching the section of rails when the trend indicates an increase in forces above a specified threshold such that the driver slows down the train before entering the section of the rails.

In yet one more aspect, the disclosure provides a method of maintaining a section of rails of a railway line, comprising:

estimating the forces in a section of the rails the method for estimating forces in rails of a railway line described above;

tracking a trend in the forces in the section of the rails over time;

issuing a warning signal to a control center of the railway line that maintenance of the section of rails is required when the trend indicates an increase in forces above a specified threshold; and repairing the section of the rails to restore the forces in the section of the rails below the specified threshold.

BRIEF DESCRIPTION OF THE DRAWINGS

Detailed characteristics and advantages will become apparent from the description of some preferred but not exclusive exemplary embodiments of a method, a system and software code according to the present disclosure, illustrated only by way of non-limitative examples with the accompanying drawings, wherein.

DETAILED DESCRIPTION

Figure 1:
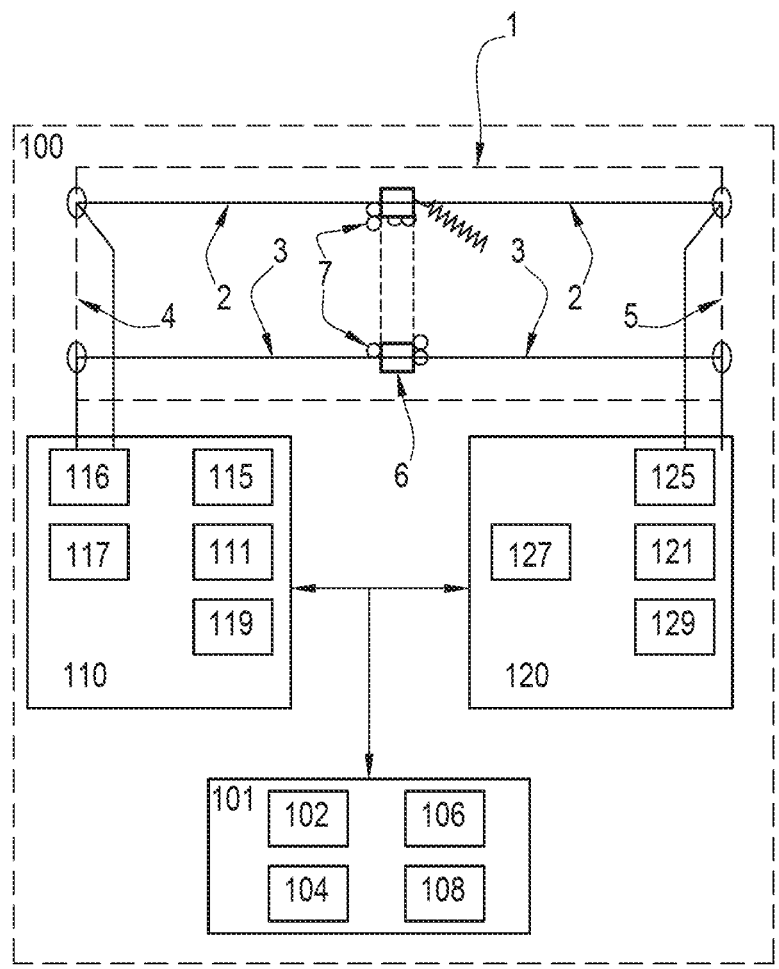
FIG. 1 is a block diagram schematically illustrating an embodiment of a control system for estimating forces in rails of a railway line which are due to the temperatures of the rails, according to the present disclosure.

It should be noted that in the detailed description that follows, identical or similar components, either from a structural and/or functional point of view, may have the same reference numerals, regardless of whether they are shown in different embodiments of the present disclosure. It should be also noted that in order to clearly and concisely describe the present disclosure, the drawings may not necessarily be to scale and certain features of the disclosure may be shown in somewhat schematic form.

Further, when the term "adapted" or "arranged" or "configured" or "shaped", is used herein while referring to any component as a whole, or to any part of a component, or to a combination of components, it has to be understood that it means and encompasses correspondingly either the structure, and/or configuration and/or form and/or positioning. In particular, for electronic and/or software means, each of the above listed terms means and encompasses electronic circuits or parts thereof, as well as stored, embedded or running software codes and/or routines, algorithms, or complete programs, suitably designed for achieving the technical result and/or the functional performances for which such means are devised. In addition, when the term "substantial" or "substantially" is used herein, it has to be understood as encompassing an actual variation of plus or minus 5% with respect to an indicated reference value, device or part thereof, time or position.

Figure 2:
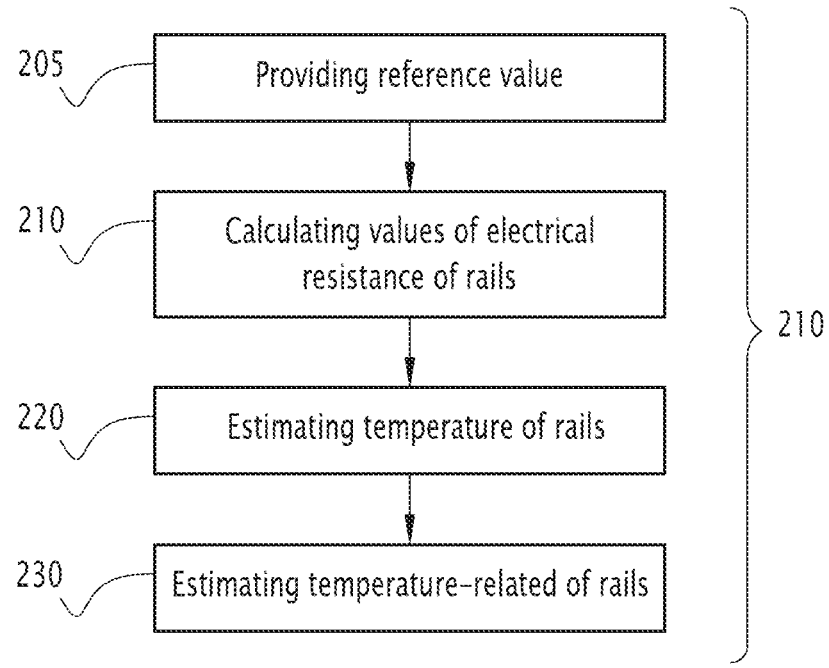
FIG. 2 is a flowchart schematically illustrating a method for estimating forces in rails of a railway line which are due to the temperatures of the rails, according to the present disclosure.

FIGS. 1 and 2 illustrate a control system 100 and a method 200, respectively, for estimating forces present in rails of a railway line due to varying temperatures of the rails, according to possible exemplary embodiments of the present disclosure.

In particular, in FIG. 1 there is schematically illustrated only one track section 1 of a railway line having a certain overall length, e.g. of some miles or kilometers. The track section 1 comprises a first rail 2 and a second rail 3, with the rails 2 and 3 running parallel to each other and forming a path along which railway vehicles can travel.

According to solutions well known in the art and therefore not described herein in details, the rail 2 is for example attached to the rail 3 through ties 6 which are laid in the ground and are substantially covered with ballast 7, i.e. small stones, to hold the ties in place. In FIG. 1 there is illustrated only one tie 6 and the ballast 7 has been represented only at a small area just for ease of illustration.

Clearly, the railway line comprises a plurality of track sections, laid one after the other along the extension of the railway line.

As illustrated in FIG. 2, the method 200 according to the present disclosure comprises at least the following steps:

210: calculating one or more values of the electrical resistance $R_{rail}$ of at least one rail of at least one track section of the railway line, e.g. the rail 2 or 3 of the track section 1;

220: based on the one or more calculated values of the electrical resistance $R_{rail}$ for the at least one rail, estimating one or more corresponding values of the temperature $T_{rail}$ of said at least one rail; and 230: based on the one or more estimated values of the temperature of the at least one rail, estimating one or more values of forces acting in the at least one due to the one or more temperature values estimated for the at least one rail.

Clearly, in view of the vicinity of the parallel rails 2 and 3 within the same track section 1, the calculations/estimations made for one of the rails, e.g. the rail 2, can be considered the same for the other associated rail 3 of the same section. In any case, if desired, it is possible to carry out such calculations/estimations, for each individual rail or portion thereof.

The control system 100 according to the present disclosure comprises at least a controller, indicated in the exemplary embodiment of FIG. 1 by the overall reference number 101, which is configured to:

- calculate one or more values of the electrical resistance $R_{rail}$ of at least one rail of at least one track section of the railway line, for instance the rail 2 of the track section 1;
- based on the one or more calculated values of the electrical resistance $R_{rail}$ for the at least one rail of the at least one track section, estimate one or more corresponding actual values of the temperature $T_{rail}$ of the at least one rail; and
- based on the one or more estimated values of the temperature of the at least one rail, estimating one or more values of forces acting in the at least one rail due to the one or more temperature values estimated for the at least one rail.

In one possible embodiment, the calculation of the one or more values of the electrical resistance $R_{rail}$ comprises transmitting along the at least one rail 2 or 3 of the track section 1 one or one or more electrical signals from a signals transmitter to a signals receiver which are positioned spaced apart from each other along the at least one rail.

Usefully, in the control system 100 and method 200 according to the present disclosure, to this end there is comprised in the system 100 and usefully exploited a track circuit installed at the track section 1, wherein the one or more electrical signals, transmitted for example at step 210, are represented by one or more electrical signals injected into the rails of the track section 1 via the transmitter of the track circuit and received by the receiver of the same track circuit.

As well known in the art, or in any case readily available to those skilled in the art, and therefore herein not described in details, track circuits are devices installed over railway lines and are primarily used to detect whether a train is present on a track section. They can be also used to detect broken rails within the track section, and/or to transmit signal aspect information through the rails, for example to communicate movement authorities of transiting trains. To this end, track circuits use electrical signals applied to the rails which are in electrical series with a signal transmitter and a signal receiver, usually positioned at respective ends of a given rail section. The signal transmitter applies a voltage, sometimes referred to as a transmit voltage, to the rails; as a result, a current signal, sometimes referred to as a transmit current, is transmitted through the rails. A portion of the transmit current, sometimes referred to as a receive current is detected by the receiver. When a train composed of one or multiple vehicles or railcars is located on the track section of the relevant track circuit, the wheels of the railcars act as a shunt between the rails and form a shunt path. The shunt path creates an electrical short between the rails at the location of the train, and such short path effectively prevents the receive current from being received/detected by the signal receiver.

In this way, the method 200 and control system 100 according to the present disclosure positively exploit the electrical signals used over the rails of a railway line for detecting the presence of transiting trains or for communicating data along the railway line, also for assessing the mechanical forces acting in the rails due to the varying temperatures of the rails themselves.

In particular, as illustrated in the exemplary embodiment of FIG. 1 such track circuit comprises a transmitter 110 which is coupled to the track section 1, for example at or adjacent to a first end 4 of the track section, and a receiver 120 which is coupled to the track section 1, for example at or adjacent to the second opposite end 5. Further, the transmitter 110 comprises for instance an energy source 115 and is configured to apply a predefined transmit voltage $V_{tx}$ to the track section 1 during operations. For example, the transmitter 110 may be configured to apply a voltage across the track section 1 at the end 4, thereby generating a transmit current $I_{tx}$. To this end, the transmitter 110 can be provided for example by suitable circuitry 116, adapted to generate different levels of coded voltages, e.g. DC voltages.

In turn, the receiver 120 comprises an energy source 125 and is configured to receive signal with a receive voltage $V_{rx}$ and to detect a receive current $I_{rx}$ during operations based on the applied transmit voltage.

The controller 101 is in operative communication with both the transmitter 110 and the receiver 120, and can be placed remotely from them, or it can be part of the receiver 120 or of the transmitter 110.

According to one embodiment, there is provided a reference or calibrating value $T_O$ of the temperature of the at least one rail, for example the rail 2 is provided, for instance at a step 205.

As illustrated in FIG. 2, this step 205 can be executed before the step 210 of calculating the one or more values of the electrical resistance $R_{rail}$. Further, this reference or calibrating value of the temperature can be provided only one time, i.e. initially, or it can be provided at any desired or needed time, for example periodically.

In one possible mode, such reference or calibrating value $T_O$ of the temperature of the rail can be provided by using a temperature sensor, e.g. an infrared thermometer, with a technician on the field manually measuring such temperature. This value can be transmitted or inputted into the controller 101.

In accordance with another possible mode, the reference value $T_O$ of the temperature of the at least one rail is provided using the air temperature available at a selected time from weather data; accordingly, the reference or calibrating value $T_O$ for the temperature of the rail can be selected as corresponding directly to the available air temperature or derived therefrom using any suitable and appropriate corrective factor. Also in this case, this value can be provided or inputted into the controller 101, or the controller 101 can be configured to derive such value from the value of the air temperature.

In one possible mode, the step 210 of calculating one or more values of the electrical resistance of the at least one rail comprises measuring, at least initially, at the transmitter 110 the transmitted current $I_{tx}$ of the one or more electrical signals injected into the rails 2 and 3 by the transmitter, and at the receiver 120 the current $I_{rx}$ of the one or more electrical signals received by the receiver 120.

In yet a further possible mode, the step 210 of calculating one or more values of the electrical resistance $R_{rail}$ of the at least one rail comprises measuring, at least initially, at the transmitter 110 the voltage $V_{tx}$ applied across the rails 2, 3 by the transmitter 110 when injecting the one or more electrical signals into the rails themselves, and at the receiver 120 the voltage $V_{rx}$ received across the rails 2, 3 of the one or more electrical signals as received at the receiver 120, when a temporary short circuit is applied across the rails 2 and 3 of the track section 1.

The temporary short circuit can be caused manually by technicians on the field, or can be applied automatically when a train transits over the track section 1.

The values of the transmitted and received currents and voltages can be executed only at the initial starting phase of assessment, e.g. when installing the control system or the track circuit, or they can be measured at any desired time, e.g. periodically, in order to carry out a recalibration from time to time.

Further, the above indicated measurements of currents and voltages can be carried out by the transmitter 110 and the receiver 120 themselves and then communicated to the controller 101.

Alternatively, corresponding signals indicative of such current values $I_{tx}$ and $I_{rx}$ can be transmitted to the controller 101 which can perform the calculations and related measurements of the relevant values.

To this end, at least one of, preferably both the transmitter 110 and the receiver 120 comprise a respective communication module 111 and 121 in data communication to each other and with at least the controller 101. Further, at least one of, preferably both, the transmitter 110 and the receiver 120 can comprise a data processor 117 and 127 respectively associated to a data storage unit, e.g. a memory 119 and 129, for storing therein for example measured or real time calculated data.

In one embodiment, as illustrated in FIG. 1, the transmitter 110 and the receiver 120 are in practice realized as substantially identical devices, and thus they can exchange their role, functioning one as transmitter and the other as receiver, and vice versa.

In one possible embodiment, the values of the electrical resistance $R_{rail}$ of the at least one rail 2, 3 is calculated via the following equation:

$$R_{rail}=2*(V_{tx}-V_{rx})/(\text{Rail length}*(I_{tx}+I_{rx})); \text{Ohms/ft}$$

wherein $V_{tx}$ is the voltage across the rails 2 and 3 at the transmit end 4, $I_{tx}$ is the current sent into the rails 2 and 3 at the transmit end 4, $V_{rx}$ is the voltage across the rails 2 and 3 at the receive end 5, and $I_{rx}$ is the current delivered from the rails at the receive end 5. The values of the transmit and receive currents $I_{tx}$ and $I_{rx}$ are known by the track circuit associated to the track section 1, as they are used for its nominal functions. The transmit and receive voltages $V_{tx}$ and $V_{rx}$ across the rails 2 and 3 are determined, at least initially and/or from time to time as previously described.

In one possible embodiment, the one or more corresponding values of the temperature of the at least one rail 2, 3 are estimated via the following formula:

$$R_{rail}=R_0[1+\alpha(T-T_0)]$$

wherein $R_{rail}$ is the actual electrical resistance calculated for the rail 2, $R_0$ is the electrical resistance corresponding to a reference temperature $T_0$ of the rail, $\alpha$ is the temperature coefficient of the material, e.g. steel, forming the body of the rail itself, T is the temperature of the material which varies over time, and $T_0$ is the reference or calibrating temperature at which $R_0$ is known.

In one possible embodiment, the one or more electrical signals, transmitted for example at step 210, are represented by one or more electrical signals transmitted from the signal transmitter 110 of the track circuit to the signal receiver 120 in a wireless manner or over a medium other than the rails of the track circuit 1.

Further, as those skilled in the art would appreciate and based on the foregoing description, the above described embodiments of the disclosure may be implemented using computer programming including computer software, firmware, hardware or any combination or subset thereof, wherein the technical effect is to estimate the forces acting on rails which are caused by the varying temperatures of the rails themselves. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network. In practice, the devised code includes software instructions which, once executed by a processor or equivalent device, carry out and/or cause suitable machinery and/or equipment to carry out the various steps/substeps of a method 200 as described in the foregoing description.

Figure 3:
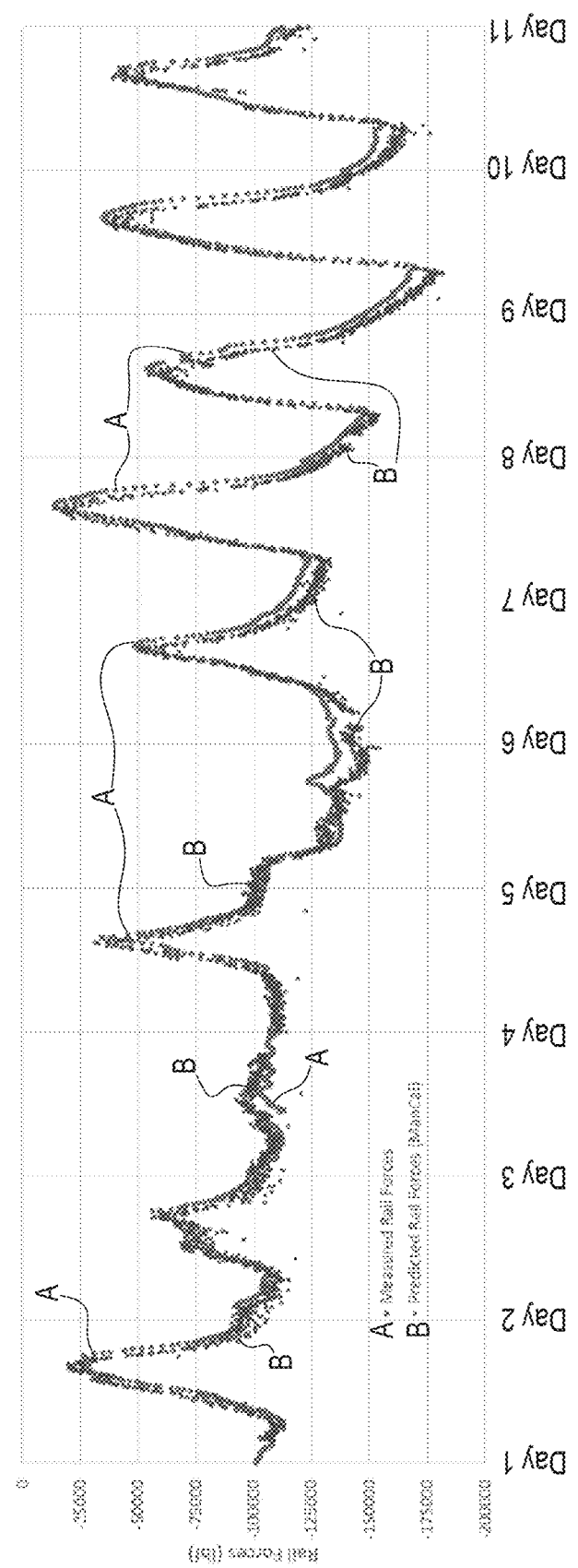
FIG. 3 is a graph comparing, over a period of time, forces acting on a rail as estimated according to the embodiment(s) of present disclosure with forces measured with strain gauges attached to the rail.

Hence, it is evident that the control system 100 and method 200, as well as the related computer-readable medium comprising software code stored therein, according to the present disclosure, provide a novel and cost effective solution for effectively predicting and properly managing the risk of rail damages due to the varying temperatures of the rails themselves, in particular their buckling, causing potential risks of derailment. Indeed, the solution devised enables to estimate quite accurately mechanical forces acting on rails due to the variations of the temperature of the rails themselves. To this end, FIG. 3 shows the rail forces (curve A) estimated according to the present disclosure, and in particular based on the calculated rail resistance using track circuit data, versus the actual forces (curve B) acting in the rails and measured with strain gauges attached to the rails themselves. As it can be easily seen, over the time period considered the measured rail forces are very close and substantially correspond to the forces estimated according to the present disclosure. Once the forces are estimated, it is possible to track their trend and then to initiate appropriate corrective measures as necessary. For example, a warning signal may be issued, for example by the controller 101, in real time to a train driver to slow down in a certain area of the railway line, and/or a warning signal for needed maintenance intervention can be sent to a control centre of the railway line, et cetera. It is worth appreciating that such results are achieved substantially without using additional equipment to be installed over railway network, and by simply exploiting equipment already present in the field, in particular track circuits.

The method 200, system 100, and related computer-readable medium comprising software code stored therein, thus conceived are susceptible of modifications and variations, all of which are within the scope of the inventive concept as defined in particular by the appended claims. For example, the controller 101 can comprise or be constituted by any processor-based device, e.g. a microprocessor, microcontroller, a microcomputer, a programmable logic controller, an application specific integrated circuit, or any other programmable circuit, schematically indicated in FIG. 1 by the reference number 102. Therefore, the term processor, as used herein, is not limited to just those integrated circuits referred to in the art as computers, but broadly refers to microprocessors, microcontrollers, microcomputers, programmable logic controllers, application specific integrated circuits, and other programmable circuits, and these terms are used interchangeably herein. Further, the controller 101 can comprise a storage unit or repository 104, e. g. a memory, for storing data or algorithms therein, a communication module 106 for communicating outside, for example with the receiver 120 and/or the transmitter 110, an own source of energy 108. Some parts of the control system 100 and or of the controller 101 and/or of the transmitter 110/receiver 120 may reside on the same electronic unit, or they can even be realized as subparts of a same component or circuit of an electronic unit, or they can be placed remotely from each other and in operative communication there between. All the details may furthermore be replaced with technically equivalent elements.

What is claimed is:

1. A method for estimating forces in rails of a railway line which are due to temperatures of the rails, the method comprising:
    injecting one or more electrical signals into at least one rail of at least one track section via a transmitter of a track circuit coupled to the at least one track section and receiving the injected one or more electrical signals at a receiver of said track circuit that is spaced apart from the transmitter;
    calculating one or more values of an electrical resistance of the at least one rail of the at least one track section of the railway line;
    based on the one or more calculated values of the electrical resistance for the at least one rail, estimating one or more corresponding values of a temperature of said at least one rail; and
    based on the one or more estimated values of the temperature of the at least one rail, estimating one or more values of forces acting in the at least one rail due to the one or more temperature values estimated for the at least one rail.

2. The method according to claim 1, wherein said calculating one or more values of the electrical resistance of the at least one rail comprises measuring at the transmitter the current of the one or more electrical signals injected into the rails by the transmitter, and measuring at the receiver the current of the one or more electrical signals received by the receiver.

3. The method according to claim 1, wherein said calculating one or more values of the electrical resistance of the at least one rail comprises, when a temporary short circuit is applied across the rails of the track section measuring at the transmitter the voltage of the one or more electrical signals injected into the rails by the transmitter, and measuring at the receiver the voltage of the one or more electrical signals received at the receiver.

4. The method according to claim 1, further comprising providing a reference value of the temperature of the at least one rail.

5. The method according to claim 4, wherein providing a reference value of the temperature of the at least one rail comprises providing said reference value by measuring manually with a temperature sensor the actual temperature of the rail at a selected time.

6. The method according to claim 2, wherein providing a reference value of the temperature of the at least one rail comprises using the air temperature available at a selected time or deriving from the air temperature available at a selected time the reference value for temperature of the rail.

7. The method according to claim 1, wherein the values of the electrical resistance of the at least one rail is calculated via following equation:

$$R_{rail}=2*(V_{tx}-V_{rx})/(\text{Rail length}*(I_{tx}+I_{rx})); \text{Ohms/ft}$$

wherein $V_{tx}$ is the voltage across the at least one rail at the transmitter, $I_{tx}$ is the current of the one or more electrical signals injected into the rails of the track section at the transmitter, $V_{rx}$ is the voltage across the rails of the track section at the receiver, and $I_{rx}$ is the current of the one or more electrical signals at the receiver.

8. The method according to claim 7, wherein the one or more values corresponding values of the temperature of said at least one rail are estimated via following equation:

$$R_{rail}=R_0[1+\alpha(T-T_0)]$$

wherein $R_{rail}$ is the actual electrical resistance calculated for the at least one rail, $R_0$ is a reference electrical resistance corresponding to a reference temperature $T_0$ of the at least one rail, a is the temperature coefficient of the material forming the at least one rail, and T is the estimated actual temperature of the at least one rail.

9. The method according to claim 1, wherein calculating one or more values of the electrical resistance of the at least one rail comprises transmitting wirelessly one or more electrical signals from a transmitter to a receiver positioned spaced apart from each other along the at least one rail.

10. A control system for estimating forces in rails of a railway line which are due to the rails temperatures, the control system comprising:
    a transmitter adapted to transmit along at least one rail of at least one track section one or more electrical signals;
    a receiver positioned spaced apart from the transmitter along the at least one rail and configured to receive the one or more electrical signals transmitted by the transmitter; and
    at least a controller, wherein the controller is configured to calculate one or more values of an electrical resistance of the at least one rail of the at least one track section of the railway line, based on the one or more calculated values of the electrical resistance for the at least one rail of the at least one track section, estimate one or more corresponding actual values of a temperature of said at least one rail, and based on the one or more estimated values of the temperature of the at least one rail, estimate one or more values of forces acting in the at least one rail due to the one or more temperature values estimated for the at least one rail.

11. The control system according to claim 10, wherein said transmitter and said receiver are the transmitter and the receiver of a track circuit coupled to the rails of the at least one track section.

12. A method of driving a train over a section of rails of a railway line, comprising:
    estimating the forces in a section of the rails according to the method of claim 1;
    tracking a trend in the forces in the section of the rails over time; and
    issuing a warning signal to a driver of the train approaching the section of rails when the trend indicates an increase in forces above a specified threshold such that the driver slows down the train before entering the section of the rails.

13. A method of maintaining a section of rails of a railway line, comprising:
    estimating the forces in a section of the rails according to the method of claim 1;
    tracking a trend in the forces in the section of the rails over time;

issuing a warning signal to a control center of the railway line that maintenance of the section of rails is required when the trend indicates an increase in forces above a specified threshold; and repairing the section of the rails to restore the forces in the section of the rails below the specified threshold.

\* \* \* \* \*